United States Patent
Tafoya et al.

(10) Patent No.: US 6,952,805 B1
(45) Date of Patent: Oct. 4, 2005

(54) SYSTEM AND METHOD FOR AUTOMATICALLY POPULATING A DYNAMIC RESOLUTION LIST

(75) Inventors: John E. Tafoya, Morgan Hill, CA (US); David S. Cortright, Sunnyvale, CA (US); Daniel W. Crevier, San Jose, CA (US); James J. O'Connor, Santa Cruz, CA (US); Michael W. Fullerton, San Jose, CA (US); Jud E. Spencer, Campbell, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,223

(22) Filed: Apr. 24, 2000

(51) Int. Cl.[7] .......................... G06F 17/00; G06F 15/16
(52) U.S. Cl. ........................ 715/739; 715/752; 709/206
(58) Field of Search .................. 715/738–739, 715/752, 764, 765, 816, 506, 507; 709/206, 214, 219; 707/1, 530, 531, 533, 534; 345/738, 739, 752, 816, 825

(56) References Cited

U.S. PATENT DOCUMENTS

| | | | | |
|---|---|---|---|---|
| 5,333,317 A | * | 7/1994 | Dann | 707/5 |
| 5,748,512 A | | 5/1998 | Vargas | 708/142 |
| 5,802,510 A | * | 9/1998 | Jones | 707/2 |
| 5,923,848 A | * | 7/1999 | Goodhand et al. | 709/219 |
| 6,151,624 A | | 11/2000 | Teare et al. | 709/217 |
| 6,154,783 A | * | 11/2000 | Gilmour et al. | 709/245 |
| 6,189,026 B1 | * | 2/2001 | Birrell et al. | 709/206 |
| 6,208,339 B1 | | 3/2001 | Atlas et al. | 345/780 |
| 6,323,853 B1 | * | 11/2001 | Hedloy | 345/810 |
| 6,349,299 B1 | * | 2/2002 | Spencer et al. | 707/10 |
| 6,377,965 B1 | * | 4/2002 | Hachamovitch et al. | 707/534 |
| 6,421,678 B2 | * | 7/2002 | Smiga et al. | 707/102 |
| 6,438,608 B2 | * | 8/2002 | Biliris et al. | 709/245 |

OTHER PUBLICATIONS

"Groupwise 5.x & 6.x". Novell, http://developer.novell.com.au/ndk/doc/gwover/index.html?gwovrenu/data/hjr1vsd8.html.
"MAPI". Novell, http://developer.novell.com/research/devnotes/1995/may/01/02.htm. May 1995.
"GroupWise User's Guide for Windows 95/98/NT" http://www.novell.com/documentation/lg/gw55/pdfdoc/55guide.pdf. 1998 pp. 110–111, 123–127, 129–131, 133–135, 149–154, and 156.*

* cited by examiner

Primary Examiner—John Cabeca
Assistant Examiner—Brian J. Detwiler
(74) Attorney, Agent, or Firm—Lyon & Harr, LLP; Mark A. Watson

(57) ABSTRACT

The system and method of the present invention automatically provides dynamically generated completion information for facilitating user input of email addresses or contact information. This completion information is developed from a "data store" comprised of multiple data sources such as previously sent or received email, and other types of electronic files such as word processor or spreadsheet files. The present invention monitors and uses the information in the data store to automatically store, track, maintain, and organize data entries in a dynamic "resolution list". As a user begins to input an email address or contact, the present invention can either automatically complete the entry using a most probable result from the resolution list, or can display a list of likely matches from which the user may select the desired email address or contact.

27 Claims, 9 Drawing Sheets

SYSTEM AND METHOD FOR AUTOMATICALLY POPULATING A DYNAMIC RESOLUTION LIST

BACKGROUND OF THE INVENTION

1. Technical Field

The present invention relates to a system and method for dynamically populating a resolution list and facilitating user input by automatically providing generated completion information in real time with suggested entries of the resolution list.

2. Related Art

Electronic mail (email) has become increasingly popular and is widely recognized as a standard form of communication. Typically, email users require an email client for sending and receiving email. Many of these email clients contain advanced features and options for the convenience of the email users. One such feature or option includes automatic email address resolution. In some systems, automatic email resolution is designed to automatically locate an email address from a user's manually created email address book. Consequently, when a user initiates composition of an email message, the user need only enter initial portions of a recipient's email address or a "friendly name" known to be associated with the recipient.

Friendly names are used to avoid the impersonal technical format of email addresses. The technical format (required by email clients to properly forward email) of an email address is usually denoted by username information followed by a connector and then domain or affiliation information. As an example, the technical format for a user's contact, whose name is Joe William Smith, might be in the form "joes554@hotmail.com" ("joes554" is the username; "@" is the connector; and "hotmail.com" is the domain), while the non-technical format or friendly name for this email address might simply be "Joe Smith". Clearly, the technical format is esoteric and harder to remember than the friendly name. Also, people sometimes randomly chose usernames, and these usernames are often not related to the actual name or the nickname that he/she is commonly known by. In addition, to complicate matters, many people have similar usernames or share the same or similar domains. As such, email resolution is designed to simplify composition of emails by allowing a user to find a recipient without requiring the user to know the recipient's exact and complete email address.

Nevertheless, these systems are limited because resolution of email addresses depends on the detailed information or "friendly information" (such as the actual names or nicknames of contacts), provided by the user for email addresses as well as the email client and its resolution technique. For instance, many email clients resolve email addresses into friendly names by comparing and verifying the user's "friendly information" entry in the "send to" portion of an email message against recipient information previously entered by the user (for example, in an email address book) and located in the user's email client's database (commonly referred to as "friendly name lookup") for that particular recipient. However, many email users do not take the time to enter friendly name information into their email address books. Thus, these systems are limited by the users willingness to update and fully complete his/her email address book.

Therefore, what is needed is an email system that not only utilizes email users' entries, but also other known information that is not dependent on the entries to automatically resolve email addresses.

SUMMARY

To overcome the limitations in the background art described above, and to overcome other limitations that will become apparent upon reading and understanding the present specification, the present invention is embodied in a system and method for dynamically populating a resolution list and facilitating user input by automatically providing generated completion information in real time with suggested entries of the resolution list. The completion information is associated with the intended user input and can be email addresses or contact information.

The completion information is initially developed from a store of data comprised of intended user input. For instance, the completion information can be previously sent or received email, data embedded within other types of electronic files, from email or other electronic documents which may not have been sent or saved to a permanent storage medium but which contained usable contact data, or from tracking email addresses or contacts used by the user when both sending and receiving messages.

The system and method automatically tracks and maintains entries, such as contacts or email addresses and organizes and maintains the tracked entries in a dynamic resolution list. As a user begins to input an email address or contact in an input entry area, the system of the present invention can either automatically complete the entry using a most probable result from the dynamic list, or can display a list of likely matches from which the user may select the desired email address or contact. Further, the list may also be accessed via a user interface that provides the user with options such as, for example, editing, saving, and exporting the list. As one example, the completion information can be presented to the user as an overlaid mini user interface pane, such as a "pop-up" user interface area. The "pop-up" user interface automatically appears over the current user interface in close proximity to the input entry area and contains the organized completion information.

In one embodiment, the present invention monitors and uses information of the store and of other electronic files, whether or not those files or information have been saved to permanent storage medium, to automatically and dynamically populate a resolution list with email addresses and contact information. Priority is given to the most recently used (MRU) email addresses and contacts when populating the resolution list. However, frequency of use and time since the last use of specific email addresses and contacts is also considered in "weighting" the entries in the resolution list. Entries having a higher weight will be chosen before matching entries having a lower weight where multiple entries match user input.

The information from the store used to populate the resolution list includes previously sent and received email addresses and contacts, and email addresses and contacts that existed on other or older software versions that were subsequently upgraded/updated. Email addresses and contacts from other electronic files, such as for example, word processor or spreadsheet files, may also be used to provide information to populate the resolution list. However, information that the user specifically enters when addressing messages, or from mail that the user receives, whether or not the mail is sent, saved or deleted, is preferably the primary source of data for the resolution list. The information extracted from the store is preferably used to initially populate the resolution list and to restore the resolution list after a "crash" or other unexpected event occurs that causes the resolution list to be lost. Once the initial resolution list is initially populated, it is dynamically updated with new email address and contact information as that information enters the data store.

Preferably, the resolution list is constrained as to the maximum number of entries that would ensure that the user does not notice a lag time while the software searches for matches in the resolution list. Because the size of the list is preferably constrained, entries of lesser weight will be replaced with entries of greater weight as the list is dynamically updated. However, in one embodiment, the user may specify the desired list size. Further, because the list is dynamic, the weights assigned to individual entries are also dynamic. The weights are continuously updated as new information becomes available.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

Figure 1:
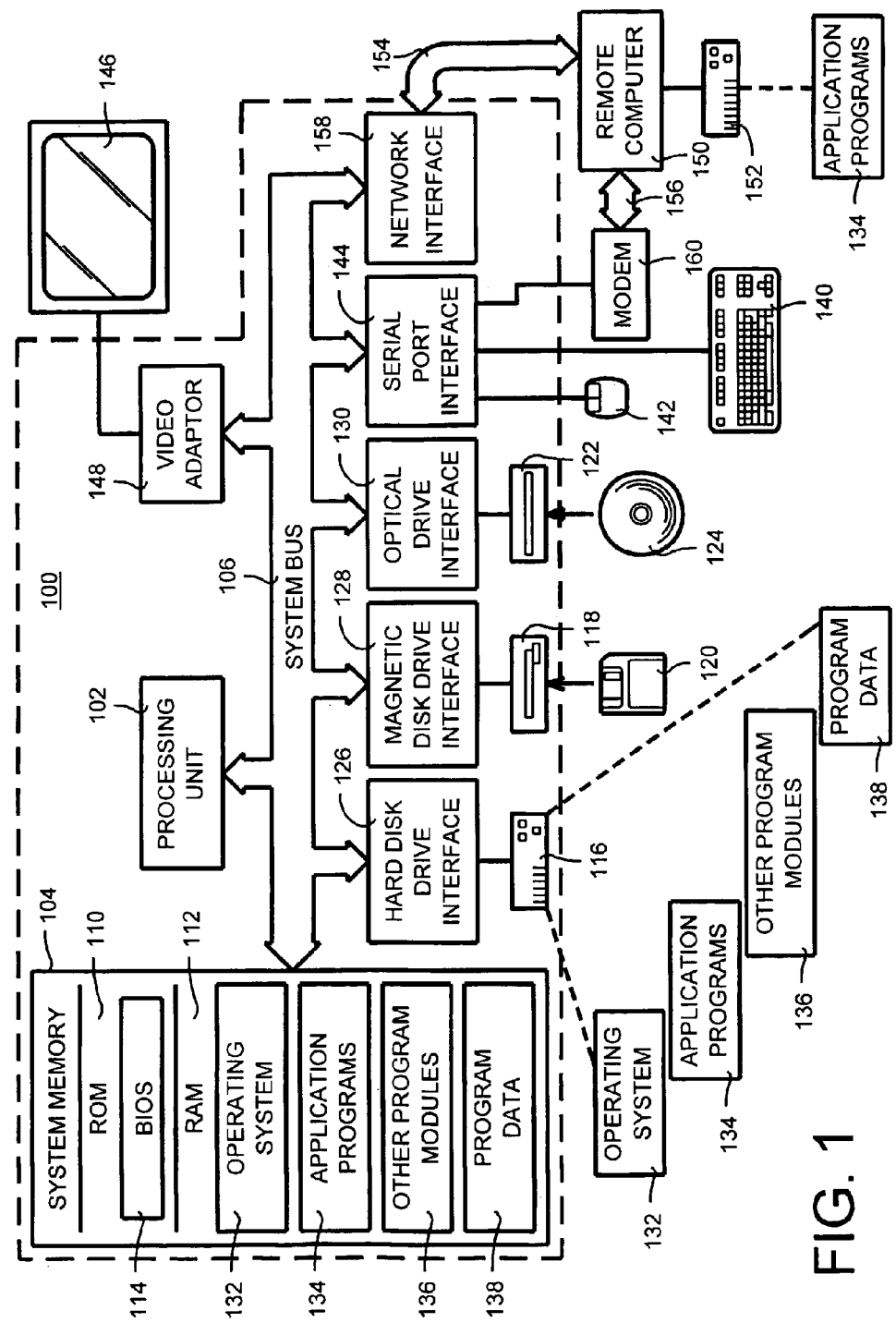
FIG. 1 is a block diagram illustrating an apparatus for carrying out the invention.

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Although users of many current electronic mail systems (email clients) have the ability to provide the email client with email address data or contact data, many users do not provide this information. This is because, initially, the user is typically required to manually enter the data in an address book database or contact database for proper population of the respective database, which is time consuming and tedious. Also, some users do not know how to populate their address book database or contact database. Consequently, resolution techniques of current email clients are limited by their users' willingness to initially populate their email address book and contact databases.

As a result, without email resolution, a user may inadvertently enter a wrong character when composing an email. This creates an incorrect email address and prevents the email from reaching its intended destination after the email is sent. Many times this error will not be obvious at the time the sender sends the email and significant time could pass before the sender realizes this error. Since one of the primary advantages of email includes quick transfer of information, this delay can be a significant drawback. Further, because many users do not manually populate their address book, and since human memory is imperfect, it is not uncommon for a user to lose track of, or simply forget an email address of someone with whom they choose to correspond with.

The present invention solves these and other problems by providing a system and method for facilitating user input of email addresses and/or contact information by automatically providing dynamically generated completion information that is not solely dependent on manual population of contact data by the user. This completion information is initially developed from an email store that is comprised of contact data manually created by the user and contact data that is automatically generated. Namely, the email store can be comprised of previously sent or received email, email addresses and contacts that existed on other or older email client versions that were subsequently upgraded and/or updated or from data embedded within other types of electronic files such as, for example word processor or spreadsheet files.

The present invention uses information of the email store to initially populate a dynamic "resolution list" with entries, such as email addresses or contacts. Following the initial population of the resolution list, the entries are dynamically organized and updated as new information enters the data store. Specifically, email addresses and contacts are cached in an in-memory resolution list accessible by address resolution code. As a user begins to input an email address or contact, a system and method according to the present invention automatically suggests one or more entries, with the most likely entry preferably highlighted, by using the most probable results from the resolution list. The user may then pick the appropriate data. Additionally, the user is preferably allowed to continue to enter data when the completion information does not match the address or contact intended by the user.

Entries in the user's "address book" (which may or may not be populated) may also be used to generate completion information. However, entries existing in the address book are preferably not added to the resolution list. Further, if an entry that is added to the address book matches an entry in the resolution list, the matching entry in the resolution list is preferably removed from the list.

When populating the resolution list, priority is given to the most recently used (MRU) email addresses and contacts. However, the frequency of use and the time since last sending to, or receiving from, specific email addresses and contacts are also considered in "weighting" the entries in the resolution list. Entries having a higher weight will be provided before matching entries having a lower weight where multiple entries match user input. Further, where multiple entries of varying weights match user input, the user, if desired, may choose from the various entries via a user interface.

Preferably, the resolution list is constrained as to the maximum number of entries to ensure that the user does not notice a lag time while the software searches for matches in the resolution list. However, in one embodiment, the user may modify the size of the resolution list via the user interface. Because the size of the list is preferably constrained, entries of lesser weight will be replaced with entries of greater weight as a full list is dynamically updated. Further, because the list is dynamic, the weights assigned to individual entries are also dynamic. These weights are continuously updated as new information becomes available.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

General Overview

Figure 2:
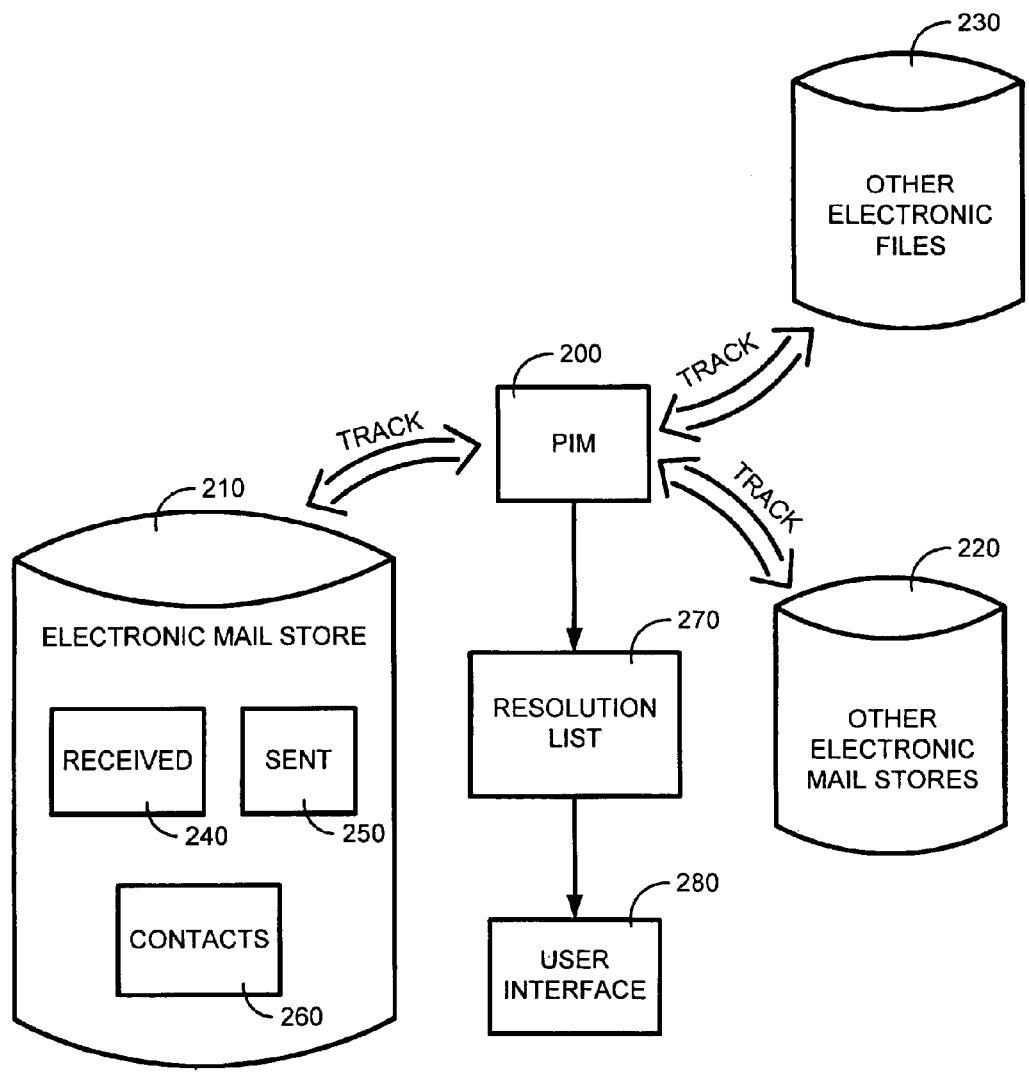
FIG. 2 is a general block diagram illustrating an overview of the present invention.

FIG. 2 is a general block diagram illustrating a system and method for automatically providing dynamically generated completion information for facilitating user input of email addresses or contact information in accordance with the present invention. First, a program information module (PIM) 200 scans sources of electronic data containing email addresses and contact information. These sources preferably include such data as an electronic mail store 210, other sources of electronic mail 220, and other electronic files, such as for example, word processor and spreadsheet files 230. Collectively, these sources of electronic data make up a "data store" from which email addresses and contact information is retrieved. The electronic mail store 210 typically contains received email 240, sent email 250, and other contact information 260. The PIM scans the data store from which it extracts email addresses and contact information that is weighted and used to initially populate a dynamic resolution list 270. Data from the resolution list is then made available to the user via a user interface 280. This process is preferably repeated to rebuild or restore the resolution list after a "crash" or other unexpected event occurs that causes the resolution list to be lost. Once the initial resolution list is initially populated, it is preferably dynamically updated with new email address and contact information as that information enters the data store.

Figure 3:
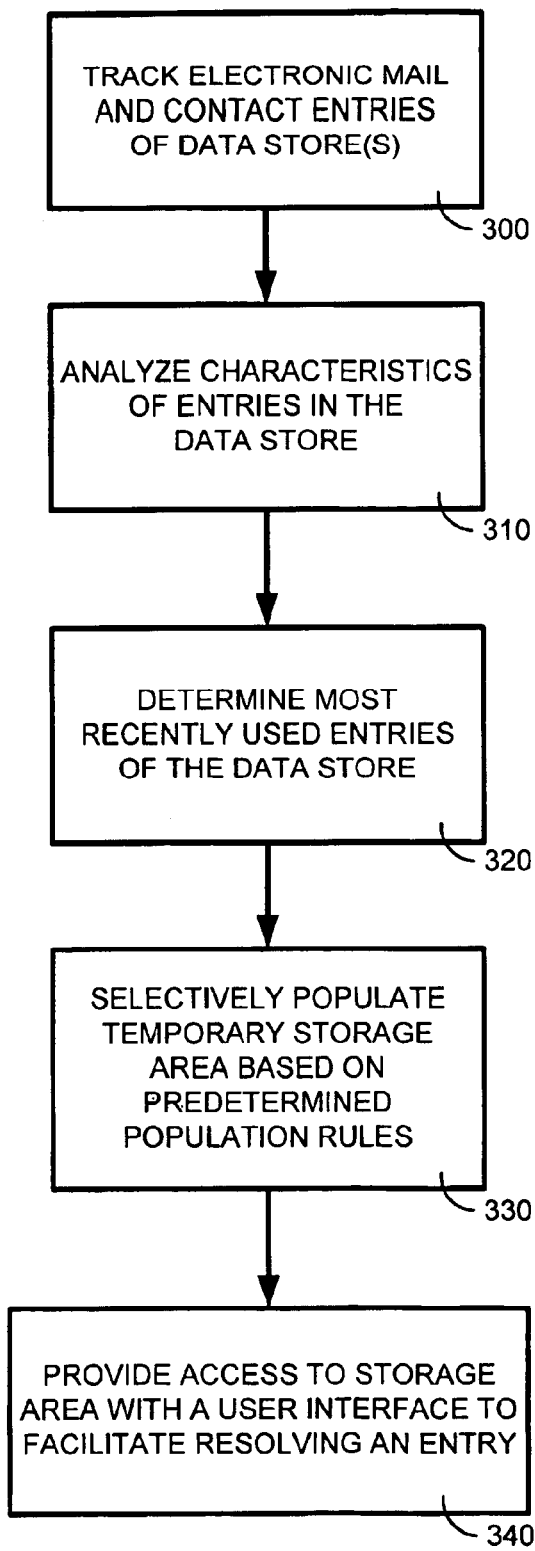
FIG. 3 is a flowchart of the general operational features of the present invention.

FIG. 3 is a flowchart illustrating the general operational features of the present invention. First, the invention preferably initially populates the resolution list with email and contact entries in the data store 300. The invention then analyzes the characteristics of entries in the data store 310. Once the entries have been analyzed, the most recently used entries of the data store are determined 320. The entries are then used to selectively populate a temporary storage area, i.e. the resolution list, based on predetermined population rules 330. Access is then provided to the storage area via a user interface for facilitating generation of dynamic completion information for an email or contact entry by the user 340.

Component Overview

The "data store" which is accessed by the PIM for extracting email addresses and contact information preferably includes multiple sources of electronic data. These sources include, for example, previously sent or received email, email addresses and contacts that existed within other or older software versions that were subsequently upgraded and/or updated with software embodying the current invention, other database mail store listings located on local or public servers, contact listings from current and/or previous contact databases or address books, and data embedded within other types of electronic files such as, for example, word processor, spreadsheet, database, or presentation files.

For example, a user typically has "inbox" and "sent items" folders, or the equivalent, which contain received and sent messages, respectively. Additional messages may be stored or archived in other "folders" or "directories." Email messages existing within this portion of the data store preferably contain useful data elements within a header of those email messages. This header preferably contains data elements such as the email address the message is being sent to, or the email address the message was received from, a "distribution list" of multiple addresses if the message was sent to more than one email address, and email addresses on the CC and BCC lines. Further, the header preferably contains the date that the message was either sent or received. In addition, email addresses and contact information are often associated with "friendly names." For example, if the email address is "joes554@hotmail.com," the friendly name associated with this email address may be "Joe Smith". The PIM can extract all of this information, among other elements, for inclusion in the resolution list.

The PIM preferably acts in the background to initially scan items within the data store for information extraction. In other words, mining of the data store for information extraction preferably occurs as a background process that is transparent to the user, and preferably in such a manner as avoid noticeably affecting other processes being employed by the user. Extracted information is formatted and weighted before entry in the resolution list. Details of how entries are formatted and weighted before inclusion in the resolution list are discussed below.

The data extracted from the data store is preferably formatted and weighted to produce "entries" for initially populating the resolution list. Entries are preferably added to the resolution list based on a set of rules that considers parameters such as, for example, the entry's weight, frequency of use, whether the user has chosen to block incoming messages from certain email addresses or internet domains (i.e. "junk email filtering"), and whether the entry already exists in the user's address book or contact database. One example of a set of rules for populating the resolution list is illustrated in the flowcharts of FIG. 4A through FIG. 4D. These rules are discussed below in detail.

The resolution list contains multiple entries, each entry preferably containing data elements such as, for example, email address or contact information, friendly name (if known), the frequency of mail sent to and/or received from the address or contact, the date the address was last sent to the date the address was last received from, and the entry's weight. Other data elements may be included or excluded by extracting either more or less information from items within the data store.

Because items within the data store can encompass many various file types and formats, these items may not always have every data element that may be desirable for inclusion in the resolution list. Therefore, the PIM is capable of operating with any combination or subset of the desired data. For example, an item in the data store may simply contain an email address or contact with no other associated information. However, as additional information is received from other items entering the data store, the properties of particular entries within the resolution list are preferably updated to include that information.

The email address or contact information typically contains an address to which correspondence may be sent. For example, a typical email address takes the form of "tom123@domainxyz.com." As a user begins to enter the email address or contact, the PIM pulls the completion information from the resolution list to complete the user's entry without the need for the user to enter the entire email address manually.

A "friendly name" is used to associate an easily identifiable name with an email address. For example, "tom123@domainxyz.com" may be the email address for "Thomas Jones." The friendly name is often tied to the email address in sent or received email, and thus may be easily extracted by the PIM for inclusion in an entry in the resolution list. While the user may not know or remember that Thomas' email address is tom123@domainxyz.com, he will likely know who he wishes to correspond with. Consequently, where a friendly name is associated with the email address, as the user begins to enter that friendly name, the PIM pulls the completion information from the resolution list to complete the user's entry without the need for the user to enter any part of the actual email address.

The number of times that mail has been sent to and/or received from a particular address or contact is preferably used in determining the weight assigned to an entry in the resolution list. Because the resolution list is dynamic, the weight assigned to an entry increases dynamically as the number of times that entry is used increases. However, the weight is preferably also dependant upon other data elements, such as, for example, the date the address was last sent to, and the date the address was last received from. Further, as time passes without an entry being used, the weight of that entry is preferably decreased. Entries having a greater weight preferably have precedence when replacing entries in the resolution list, as is discussed below.

Component Details and Operation

FIGS. 4a through 4d are flowcharts that illustrate one possible set of rules for populating the resolution list from items within the data store. The size of the resolution list, i.e. how many entries may be held in the list, is preferably constrained as to the maximum number of entries that will ensure that the user does not notice a lag time while the software searches for probable matches in the resolution list. However, in one embodiment, the user may modify the size of the resolution list.

Pre-population of the Resolution List

In initially building the resolution list, or restoring the resolution list following a "crash" or other unexpected event occurs that causes the resolution list to be lost, addressing information from users' data stores and from data available after software upgrades or competitive application conversions will be extracted and used to pre-populate the resolution list. If the number of entries in the resolution list reaches the maximum allowed during the pre-population operation, entries having greater weights will replace those entries having lower weights, starting with the entry having the lowest weight. Consequently, if the items within the data store contain insufficient data to completely fill the resolution list, all of the available data will be added to the resolution list.

Because the user's address book and contact database is preferably available to the PIM for generation of completion information, email addresses and contact information that is already stored in the user's contact database or address book need not be added to the resolution list.

Repeated instances of identical email addresses or contact information within a single item in the data store preferably do not have a multiplier effect on the weight of an entry in the resolution list. Further, multiple duplicate entries are preferably not added to the resolution list in this case. For example, if "joe@ips.com" is entered more than once in the "To" field of a message, or in more than one place in the message, the effect on the weight of the entry will be the same as if it was entered only once on the "To" line. However, repeated instances of the email address or contact information within multiple items in the data store preferably serves to increase the weight of the associated entry in the resolution list.

In addition, single items within the data store may contain data sufficient for multiple unique entries in the resolution list. For example, the To, CC, and BCC fields of a sent or received email message within the data store may provide multiple unique email addresses or contact information. Further, distribution lists in an email message are preferably added as multiple separate entries to the resolution list in the same manner as if each addressee in the distribution list were in a separate email message.

Updating the Contents of the Resolution List

Following the initial pre-population of the resolution list, entries in the list are preferably inserted, removed, and/or updated according to a set of rules similar to those for pre-population of the list. Each time the PIM is started after the initial pre-population of the resolution list, the PIM preferably scans the data store and updates existing entries in the resolution list. This is preferably done as a background process, but may also be done as a foreground process if user input requires access to the resolution list before it has finished being updated. In addition, as the user enters new email addresses or contact information in an email message, or as new email messages having email addresses or contact information are received, that information is also used by the PIM to dynamically update the resolution list. Further, new entries are preferably added to the resolution list in accordance with the applicable rules as discussed below.

Preferably, an email address or contact should be used in a send or receive operation before it is added to the resolution list. For example, if a message note is opened and addressed to "billc@whitehouse.gov," the address is resolved, but if the message is then closed without being saved, the resolution list is unaffected. Similarly, if email messages are waiting in the outbox when an SMTP server goes down or when the user is working offline, the email addresses or contacts in the effected messages are preferably not added to the resolution list because those messages were not successfully sent. In other words, entries are preferably added to the resolution list upon confirmation of send (such as by either SMTP or DAV server), or by saving the message as a draft.

The properties of email addresses and contacts that already exist in the resolution list are preferably updated as new information becomes available in the data store; otherwise, they are added as a new entry to the resolution list. Consequently, each time an email address or contact from the list is used, its properties are preferably updated. As discussed previously, these properties include such elements as email address or contact information, friendly name, the frequency of mail sent to and/or received from the address or contact, the date the address was last sent to, the date the address was last received from, and the entry's weight. Matching within the resolution list is preferably done by email address. As a result, when a match is found in the resolution list (by email address), data elements in the entry, such as the friendly name will be updated with however those elements are set in the new data item.

As with pre-population of the resolution list, when the resolution list is "full," new entries extracted from the data store may be added to the resolution list by replacing existing non-duplicate entries with lower weight values, starting with the item with the lowest weight value. Weight may be calculated using many different parameters, however, the parameters which are preferably used to calculate weight include the number of times that the email address or contact has been used for either sending or receiving ($N_u$), the number of days since the address was last used in a send operation ($N_s$), and the number of days since the address was used for a receive operation ($N_r$). One example of an equation that uses these parameters to calculate the weight of individual entries in the resolution list is:

$$\text{Weight} = \frac{N_u^2}{((1+N_s)+(2*N_r))}.$$

As discussed previously, the weight of an entry in the resolution list is dynamic, and is preferably updated both as new data becomes available and as time passes.

In the case where an item within the data store contains multiple entries (From, To, CC, BCC, "distribution list," etc . . . ), the entries are added as a "batch operation." Specifically, the criteria used to determine whether or not an entry should be added to the resolution list (and therefore bump entries out of the resolution list if it is full) preferably remains intact until the batch operation is done. In other words, the criterion is preferably reset after each message is sent or received, or after an item is added to the data store, not simply after each entry is added to the resolution list. Consequently, the weights of entries in the resolution list are preferably not updated until the batch operation is complete. Therefore, it is possible that entries added to a full resolution list in a batch operation may be replaced with other entries from the same batch operation having an equal or greater weight before the batch operation is complete. The determining factor is the weight assigned to entries already existing within the resolution list, and the weight of the entries being added to the list.

In the case where multiple entries within the resolution list have the same, yet lowest, weight value as a new potential entry, the new entry will be added and the item replaced will be determined arbitrarily from within a set of entries having the same weight value. This rule preferably applies to cases of batch entries as well as single entries.

Because junk email is becoming a common concern, the resolution list of the present invention preferably avoids processing junk email for inclusion in the list. This may be implemented in various ways, such as, for example, allowing the user to block incoming messages from certain email addresses or Internet domains, providing a junk email folder, or it's equivalent, into which junk email may be placed, or by removing entries associated with deleted items from the resolution list. Blocked messages, or messages in the junk email folder are preferably not processed for inclusion in the resolution list. If a user chooses to block email from a certain email address or domain after previously having allowed receipt of such messages, any entries in the resolution list associated with the blocked material are preferably removed from the list.

The user's address book and/or contact database is preferably available to the PIM for generation of completion information. Consequently, email address and contact information that is added to the address book and/or contact database need not also be located in the resolution list. Therefore, when an entry in the address book or contact database is saved, any matches on email address found in the resolution list are preferably removed from the list. Further, the resolution list is preferably unaffected by changes (other than new email addresses or contacts) in the address book or contact database. For example, if the properties of an email address or contact are changed in the address book or contact database, or an email address or contact is deleted from the address book or contact database, the resolution list is unchanged. However, once an email address or contact has been deleted from the address book or contact database, it may be subsequently added to the resolution list based on subsequent usage or if it is supported by data within the data store.

While the maximum size of the resolution list is preferably constrained to ensure that the user does not notice a lag time while the software searches for probable matches in the resolution list, the initial or default value may be modified by the user. The user, through a user interface, may increase or decrease the size of the resolution list to suit his needs. Further, if the user desires to disable the resolution list, the user may either set the size of the list to zero, or simply disable the list from the user interface.

While the resolution list is preferably stored in RAM to enable rapid access, it is also preferably cached to disk so that the list will remain accessible both between instances of the application and operating system reboots. If the user chooses to disable the resolution list, the list is preferably cached to disk, but is preferably no longer accessible for generation of completion information, and is preferably not updated while disabled. However, if the user then chooses at a later time to re-enable the resolution list, the prior list is preferably read from disk. The PIM then updates this list based on the current contents of the data store as discussed above. Further, in the event that the resolution list becomes corrupted, or has been flushed by setting the maximum number of entries to zero, the list is preferably re-populated as in the pre-population case discussed above.

The rules discussed above for pre-population and updating of the resolution list may be summarized by the flowcharts of FIG. 4A through FIG. 4D, which illustrate one possible set of rules for implementing and maintaining a resolution list in accordance with the present invention.

Figure 4A:
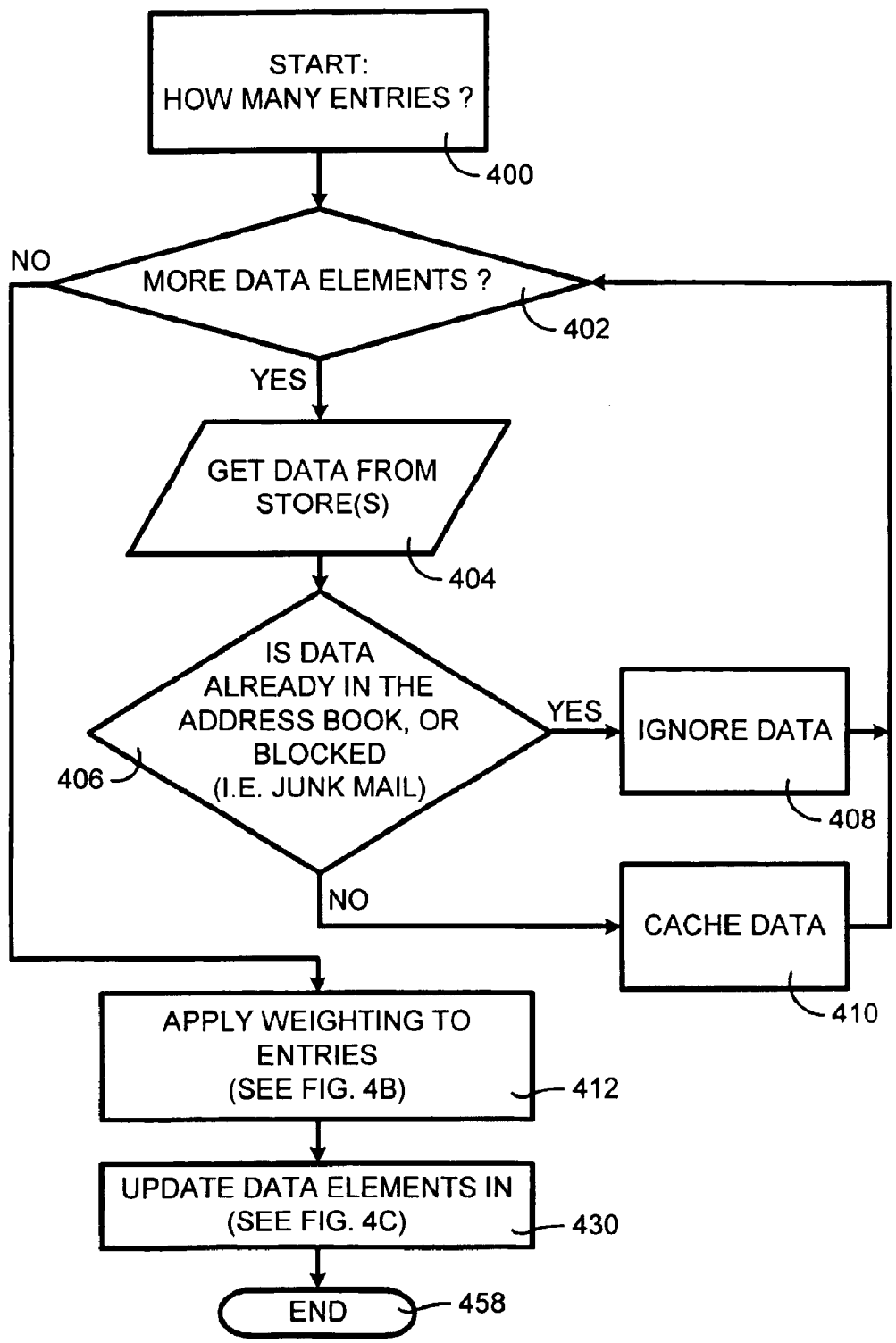
FIG. 4A is a flowchart illustrating one set of rules for initially populating a resolution list in accordance with the present invention.

Specifically, FIG. 4A is a general flowchart illustrating the initial pre-population, or recreation of the resolution list. The procedure is started by determining the number of entries to be included in the resolution list (Box 400). Next, a determination is made as to whether more entries are needed to complete the list (Box 402). If more entries are needed, the data for the entries is extracted from the data store(s) (Box 404). Next, a determination is made as to whether the data extracted from the data store already exists in the user's address book, or is blocked (i.e. junk email) (Box 406). If the data is blocked, it is simply ignored (Box 408). If the data is not blocked, it is added to the resolution list (Box 410). These steps are repeated until the resolution list is full, or until all information in the data store(s) has been scanned, at which point, the entries which have been added to the resolution list are weighted (Box 412). Box 412 is further detailed in the flowchart of FIG. 4B.

Figure 4B:
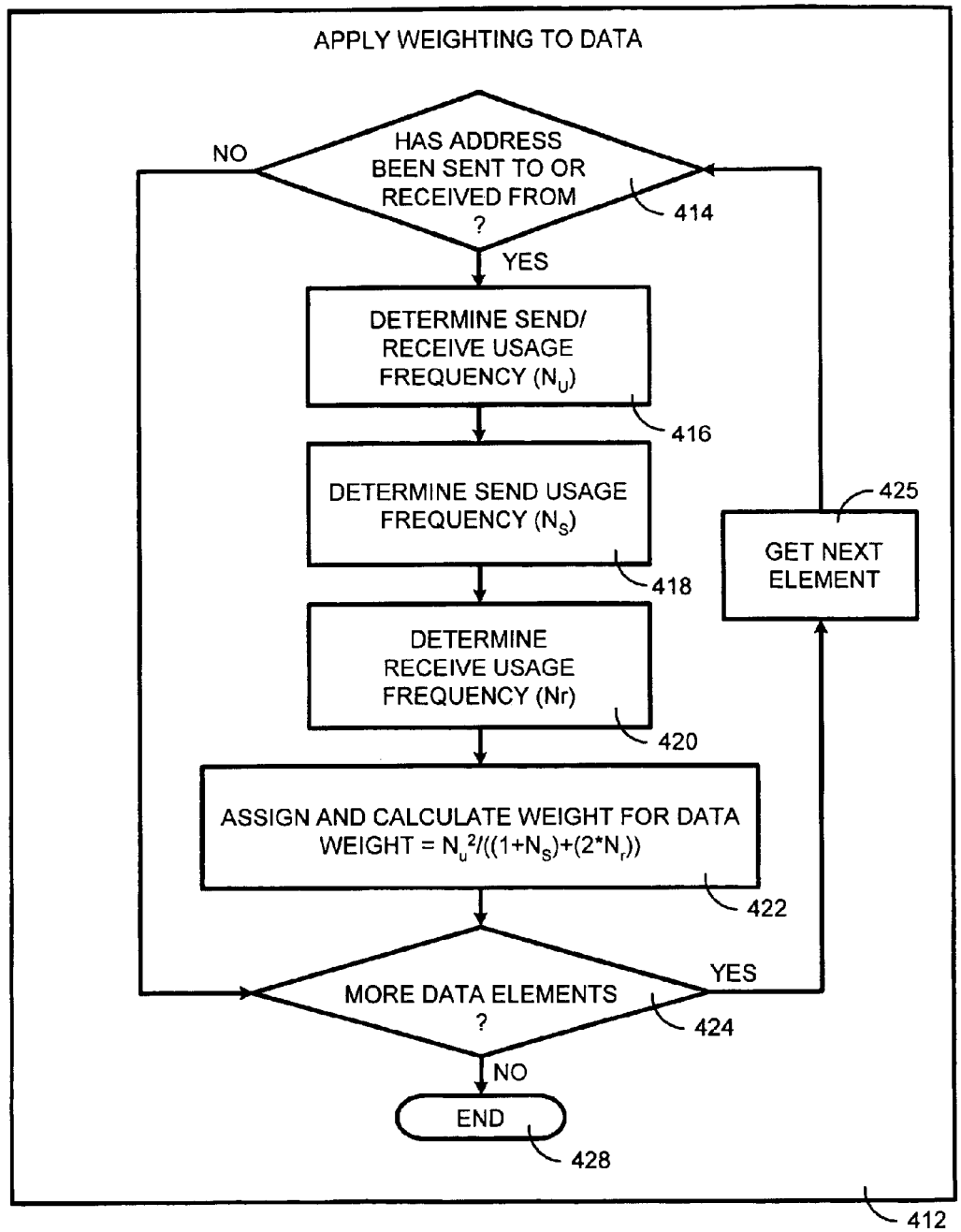
FIG. 4B is a flowchart illustrating one set of rules for weighting entries in the resolution list of FIG. 4A.

Each entry in the resolution list is preferably individually weighted as illustrated in FIG. 4B (Box 412). First, a determination is made as to whether the address in an entry has been sent to or received from (Box 414). If the address has been used to send or receive, a determination of send/receive usage ($N_u$), is made (Box 416). Next, a determination of the send frequency ($N_s$) (Box 418), and the receive frequency ($N_r$) (Box 420) is made. These values are then used to calculate and assign a weight to each entry (Box 422). This weighting process is repeated for each entry in the resolution list.

Figure 4C:
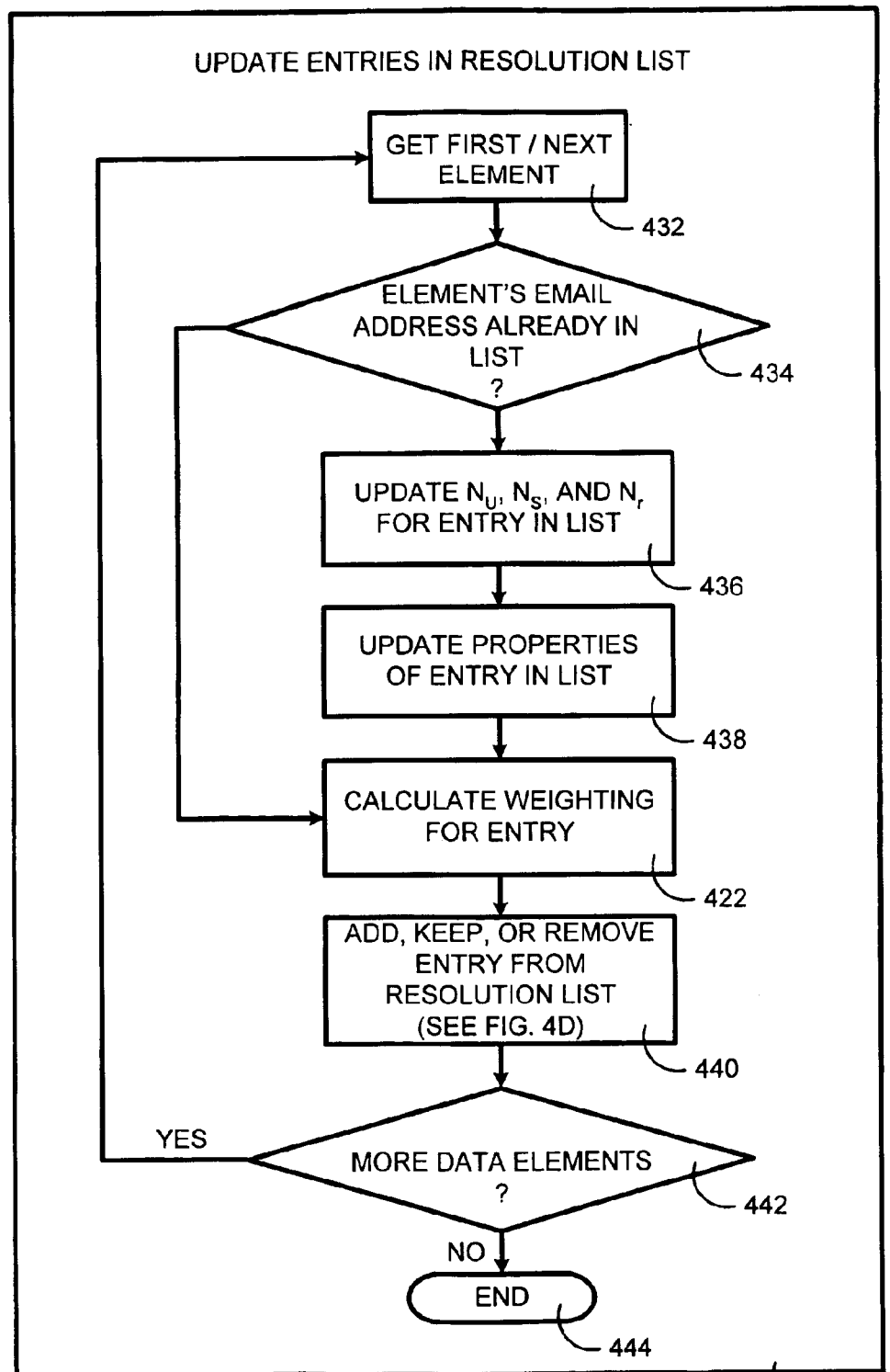
FIG. 4C is a flowchart illustrating one set of rules for updating the properties of entries in the resolution list of FIG. 4A.

Following the initial pre-population and weighting of the resolution list, entries in the resolution list are updated as new information enters the data store (Box 430). FIG. 4C is a general flowchart that further details Box 430 of FIG. 4A, by illustrating one method for updating entries in the resolution list. Each data element entering the data store(s) (Box 432) is examined to see if the email address or contact information already exists in the resolution list (Box 434). If the address or contact information already exists in the resolution list; the values for send/receive usage ($N_u$), send frequency ($N_s$) and receive frequency ($N_r$) are updated (Box 436). Further, other properties of the entry, such as the friendly name, are also updated (Box 438). The weight of the entry is then calculated (Box 422) whether or not contact information already existed in the resolution list. Once the weight is calculated, a determination is made as to whether the entry should be added to, kept in, or deleted from the resolution list (Box 440). These steps are preferably repeated until all new data entering the data store has been examined (Box 442).

Figure 4D:
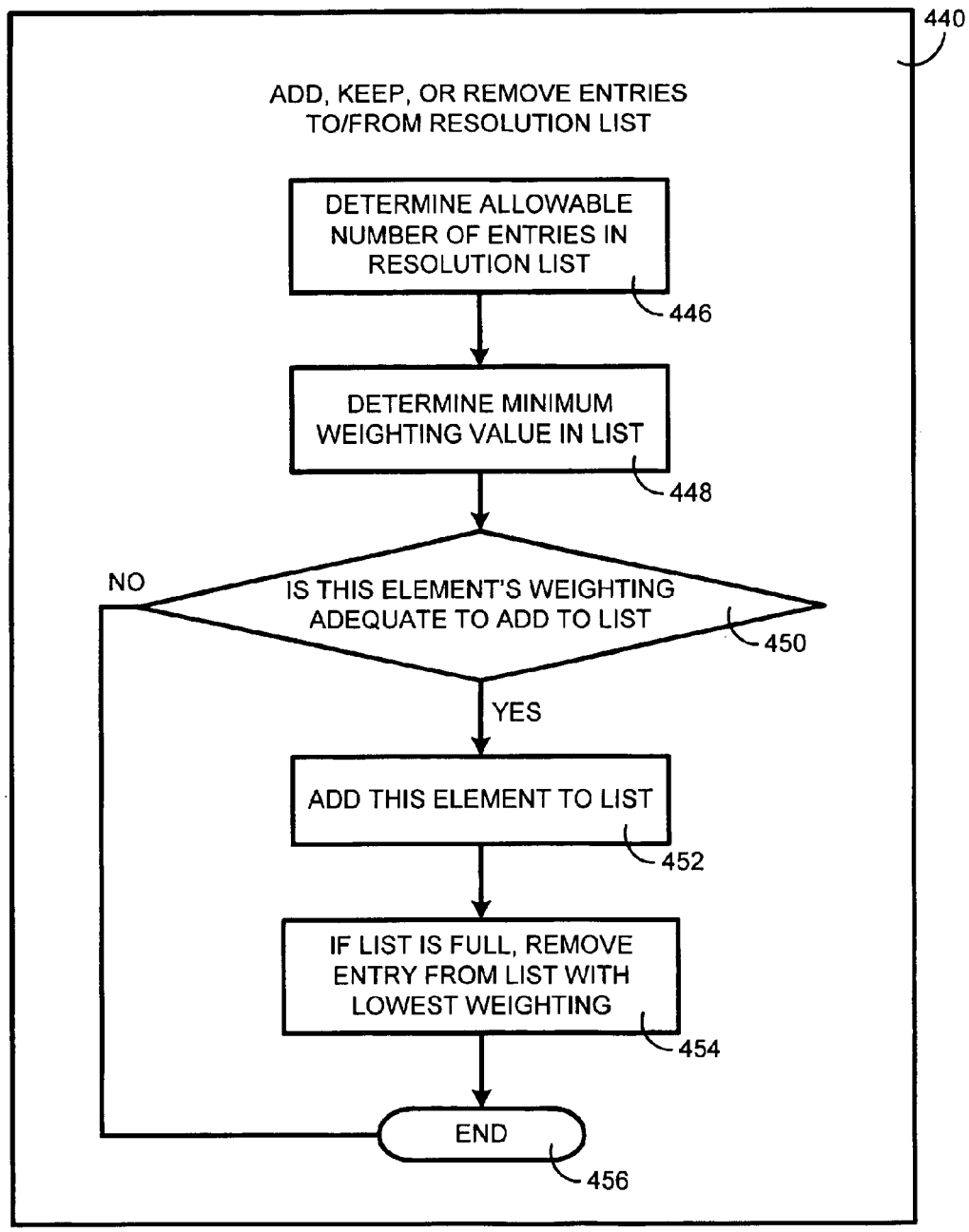
FIG. 4D is a flowchart illustrating the rules for adding or removing entries to or from the resolution list of FIG. 4A.

FIG. 4D is a general flowchart illustrating one method for determining whether the entry should be added to, kept in, or deleted from the resolution list. Specifically, a determination is made as to the allowable number of entries in the resolution list (Box 446). Next, a determination is made as to the minimum weighting value for entries in the resolution list (Box 448). The weight of a new potential entry is compared to the minimum weight (Box 450). If the weight of the new candidate is greater than the entry in the resolution list having the lowest weight, the new candidate is added to the resolution list (Box 452). If the maximum allowable number of entries in the resolution list has been exceeded, the entry having the lowest weight is removed from the resolution list (Box 454).

User Interface Integration with Resolution List

Figure 5:
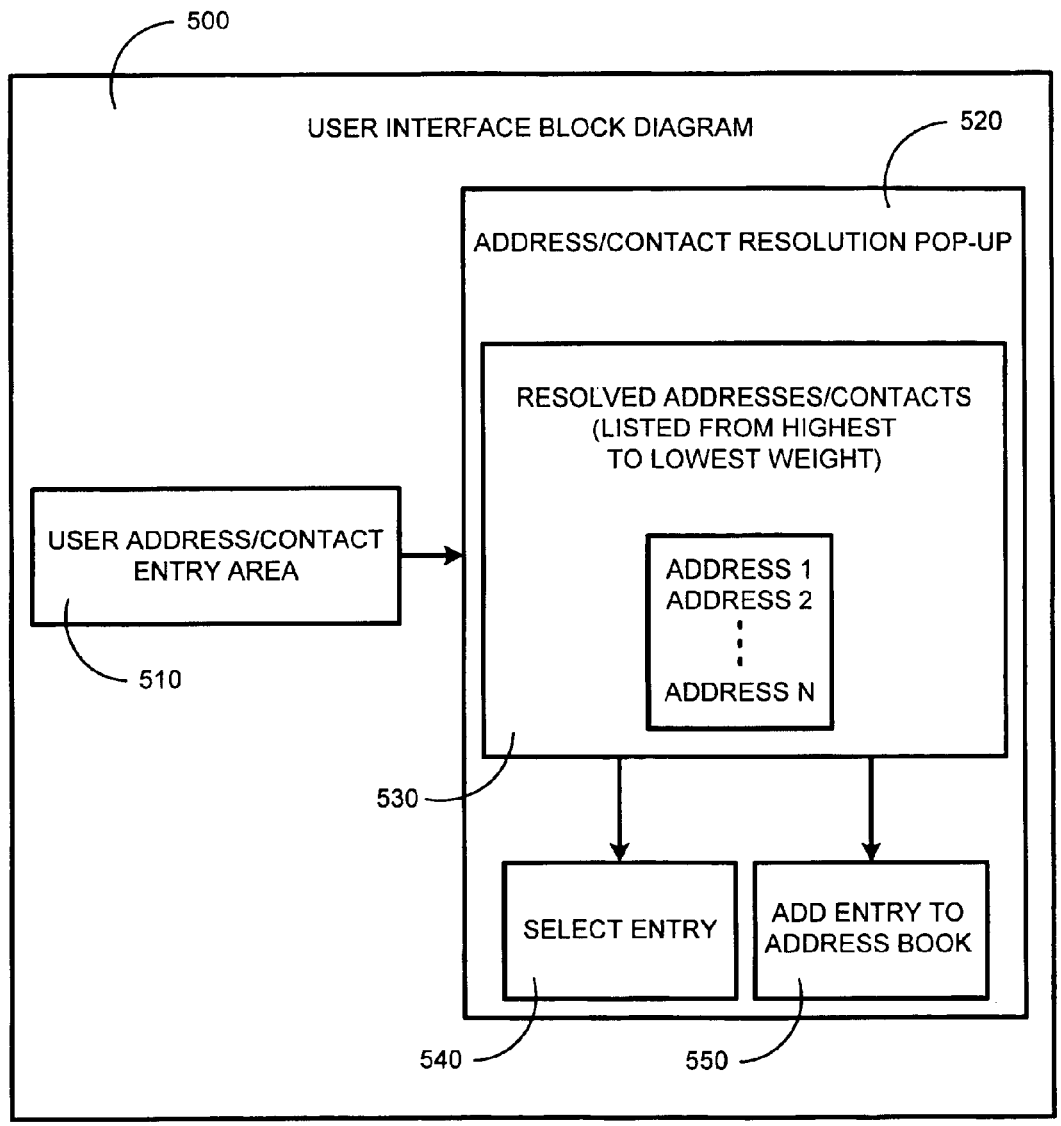
FIG. 5 is a general block diagram of a user interface in accordance with the present invention.

One example of a user interface that may be implemented with a system and method in accordance with the present invention is illustrated as a block diagram in FIG. 5. The user interface 500 for the resolution list preferably provides a data entry area 510 wherein the user can manually enter the desired email address or contact. As described above, completion information is automatically generated from both the resolution list and the user's address book as the user begins to enter the address or contact. This information is provided to the user via an address/contact resolution pop-up 520. The pop-up 520 preferably displays resolved email addresses or contacts 530 that are possible matches to the users partial input. These resolved addresses or contacts are displayed in order beginning with the entry having the highest weight. In other words, the entry most likely to match the user's desired input, based on the criteria described above, is displayed first, with other possible matches displayed in descending order of likelihood of matching the user's partial input.

The address/contact resolution pop-up 520 also preferably provides an option via a "push-button" or the equivalent for the user to select the desired entry 540 from the resolution list for addressing the email with auto-completion information as described above. Further, because entries are displayed from highest to lowest weight 530, the user may browse the contents of the resolution list. While browsing the resolution list, the user interface preferably allows the user to selectively add entries 550 from the list to his or her address book or contact database. As discussed previously, entries added to the address book or contact database are preferably removed from the resolution list.

Further, because it is considered beneficial to populate the user's address book or contact database with frequently used email addresses and contacts, the PIM, through the user interface, may automatically suggest that the user add certain resolution list entries to the address book or contact database. This feature is preferably based on an entry's weight and frequency of use.

Figure 6:
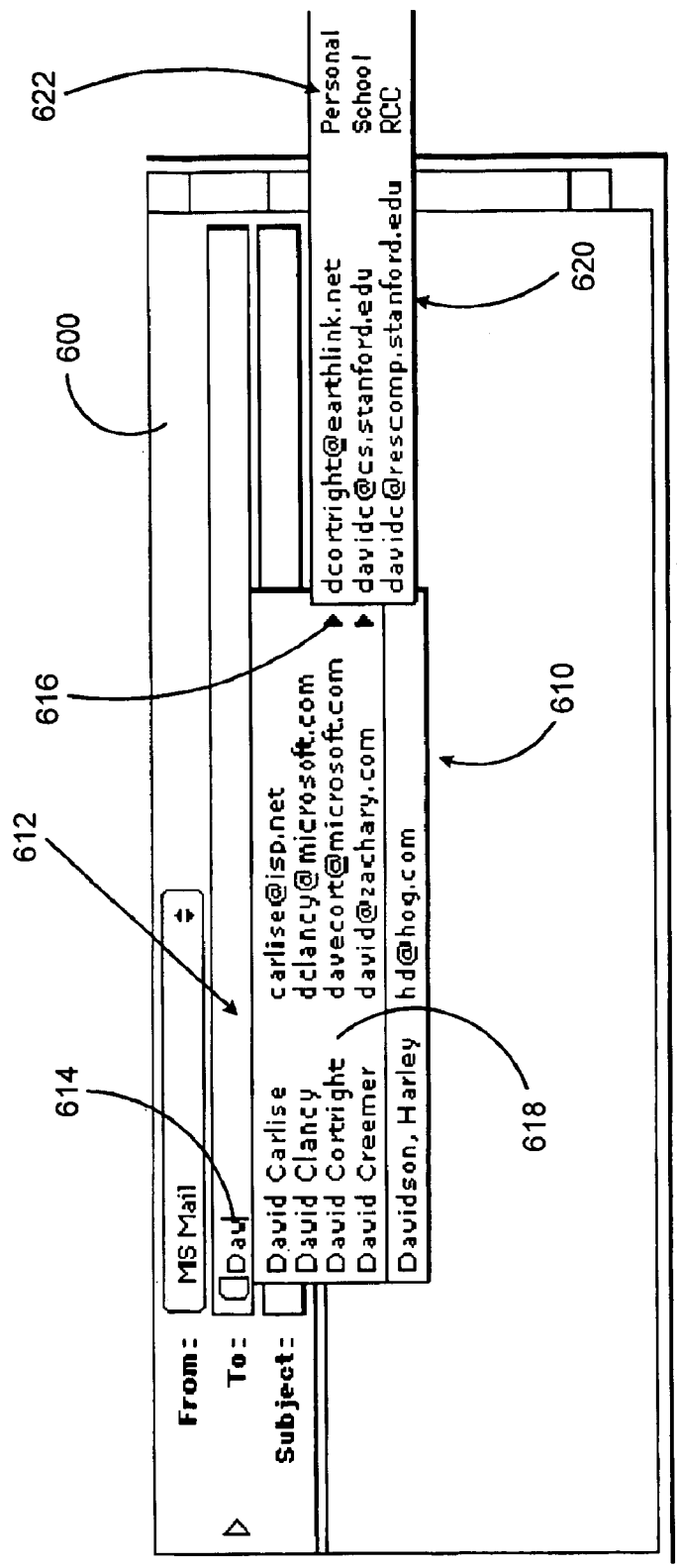
FIG. 6 is a sample user interface incorporating the present invention.

FIG. 6 is a sample user interface for an email client utilizing the present invention. The pop-up user interface 520 can be implemented as shown in FIG. 6. The user interface of FIG. 6 allows efficient email addressing by minimizing users' keystrokes and mouse clicks. In particular, as shown in FIG. 6, the user interface 600 can include a pop-up user interface that automatically appears near a data entry area 612 when the user initiates data entry in the area 612.

As discussed above, a list of the most recently used (MRU) sent to and received from addresses can be used to populate the pop-up menu 610. The MRU list can be integrated with multiple addressing sources. An MRU that is populated with sent to and received from addresses helps novice users that are unaware or unfamiliar with address books. These novice users often complete email addresses to a particular user by finding an older message that was either sent to or received from the particular user. Each address can be assigned a weighting value determined by 1) whether the address was sent to (higher weighting) or received from (lower weighting); 2) the number of times the message has been sent to/received from; and 3) the frequency of sending/receiving (i.e. number of messages divided by the time that has passed between the first message and the current time); Addresses with weights below a certain threshold value can be dropped off the list. Also, addresses with high weights can initiate a prompt to the user to suggest adding to the contact to the user's address book.

For illustrative purposes, as a user types characters into an addressing field 612, a pop-up menu 610 appears directly below the cursor 614, as shown in FIG. 6. The pop-up menu 610 is preferably vertically aligned with the left edge of the data entry area 612. The popup menu 610 is populated with entries as discussed above and in accordance with the present invention, such as entries whose first name, last name, nickname, or email address starts with the same string that the user types in the data entry area 612. The string matching is preferably not character case sensitive. As the user types, the pop-up menu 610 is dynamically updated so that it contains only those items which start and match with the currently entered string. If the user deletes characters, the pop-up menu 610 is similarly updated and possibly expanded.

In the example of FIG. 6, as the user has types "dav", the popup window 610 is populated with entries in accordance with the present invention. The pop-up menu 610 preferably has three columns. The columns contain different data depending on which portion of data from the contact matches the typed string. It should be noted that that groups can be matched against the name of the group. The different types of data are outlined in TABLE 1 below.

TABLE 1

| Autofill by: | 1st Column | 2nd Column | Example |
| --- | --- | --- | --- |
| First name | <first><space><last> | <greater than><email address><less than> | Bob Jones <bj@isp.com> |
| Last name | <last><comma><space><first> | <greater than><email address><less than> | Jones, Bob <bj@isp.com> |
| Nick-name | <nickname><space><open paren><first><space><last><close paren> | <greater than><email address><less than> | BJ (Bob Jones) <bj@isp.com> |
| Email address | <email address> | <first><space><last> | bj@isp.com Bob Jones |
| Group name | <group name> | <open paren><number of contacts in group><space>recipients<close paren> | Humor List (7 recipients) |
| Mailing List Manager item | <mailing list name> | <greater than><list address><less than> | MacOE-Talk <macoe-talk@lists.boingo.com> |

The last column displays a sub-menu arrow 616 if a contact 618 has more than one email address. The arrow can be selected by the user to produce a sub-pop-up menu 620 with extended entries 622 related to the contact 618 or all of the addresses associated with the contact. However, if the entry matches an email address, a sub-pop-up menu preferably does not appear even if the contact has multiple addresses. The sub-pop-up menu 620 is shown by default when the selection is on an item with a submenu. However, an item in the sub-pop-up menu 620 is not selected until a user explicitly presses the right arrow button or moves the mouse over an item. Once the keyboard is used to move the selection, the position of the mouse should be ignored until it is moved past a threshold value (such as 5 pixels). The sub-pop-up menu is displayed so that the second address is aligned with the main menu item as shown in FIG. 6. This minimizes the number of keystrokes for a user to select a non-default address.

Each contact preferably appears only once in the pop-up menu 610. However, a particular contact may appear in the list multiple times if multiple matches of the contact exists (i.e. David Davidson <davidd@isp.com>). If this occurs, then the following precedence is preferably used: first name, last name, nickname, email address. The precedence of the first two items can be switched by the preference for whether to list contacts in the address book by first name or last name. If the entry no longer matches a higher up precedence as a user continues to type to constrain the name matches, then the entry will reappear in the list at the next lower precedence that matches. For example, as the user enter data from "david" to "davids", the entry would change from "David Davidson <davidd@isp.com>" to "Davidson, David <davidd@isp.com>".

If there are two or more contacts with the exact same display name (first & nickname & last), another identifier, such as company name, can be appended in parentheses to the display name to help users distinguish among contacts. If one of these contacts is selected, the display name in the addressing header reverts to the standard first & last; nickname and the additional identifier is omitted.

Certain keystrokes can have new functionality when the user is in the middle of a type-ahead, as illustrated in TABLE 2 below:

TABLE 2

| | |
|---|---|
| Return or Enter | In auto-complete mode: Enter the currently selected auto-filled contact as a verified address, change proxy icon to "contact", and place the cursor on the next recipient line.<br>When a recipient is selected: Close the addressing input popup and place the focus in the Subject field with the entire contents of the Subject field selected.<br>On an empty recipient line: Close the addressing input popup and place the focus in the Subject field with the entire contents of the Subject field selected. |
| Tab | In auto-complete mode: Enter the currently selected auto-filled contact as a verified address, change proxy icon to "contact", and place the cursor on the next recipient line.<br>When a recipient is selected: Select the next recipient in the list, or move to a new empty recipient line if the currently selected one is last.<br>On an empty recipient line: Close the addressing input popup and place the focus in the Subject field with the entire contents of the Subject field selected. |
| Shift-Space | In auto-complete mode: Auto-fill up to and including the first space in the selected contact (i.e. "dav" becomes "David") and remain in auto-complete mode. |
| Arrow keys | Cycle up/down through addresses in the list that match the current string. Move focus between the main menu and the sub-menu (if one exists). Up and down arrow keys in the submenu will cycle (i.e. down arrow on the last item will move selection to the first item). Arrow key navigation overrides the position of the mouse. Note: with regard to insertion point and menu selection, the arrow keys preferably do not control the insertion point during type-ahead. Using the Command key modifier in conjunction with the arrow keys will move the insertion point. |
| Delete | Delete the last character typed and update the current auto-completed address list as appropriate. |
| Escape | In auto-complete mode: Hide the auto-complete pop-up and do not bring it back up again on this text string for the remainder of the time that the user is typing this string (that is, until the user types Return and accepts the text as an object. If the user then clicks into the object and types more, the pop-up can come back up).<br>Otherwise: Close the addressing popup. |
| Control-Return | Bring up an auto-complete pop-up filtered on the word or prefix to the left of the insertion point. This can be used to bring up the pop-up after it has been dismissed with the Escape key. |
| . (period) | In the context of a newsgroup, this is similar to the Tab key. For example, if I type re.hu.fu I should get rec.humor.funny |

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electronic contact resolution method, comprising:
   automatically extracting contact information from any of a plurality of file types included in a data store, said data store including at least one of word processor files, spreadsheet files, and presentation files;
   wherein extracting the contact information includes automatically examining the complete contents of one or more of the files in the data store and extracting any contact information located within those contents;
   maintaining a list of at least one contact entry derived from the contact information extracted from the data store;
   automatically computing a weight for each entry in the list;
   tracking contact information associated with the contact entry;
   automatically resolving contact entries in real time by dynamically providing specific contact entries from the maintained list based on the weight of each entry in the list;
   wherein new entries are added to the list as new information enters the data store;
   wherein entries are removed from the list and replaced with new entries when the list is full; and
   wherein entries are assigned relative weights, and wherein new entries having weights that are at least equal to the weights of existing entries in the list are added to the list to replace the existing entries.

2. The method of claim 1 wherein the data store includes sent and received email.

3. The method of claim 2 wherein the data store further includes database files.

4. The method of claim 1 wherein the weight of an entry is updated dynamically based on the number of times that the entry has been used.

5. The method of claim 1 wherein the weight of an entry is updated dynamically based on the time since an email using the contact data of the entry was sent.

6. The method of claim 1 wherein the weight of an entry is updated dynamically based on the time since an email using the contact data of the entry was received.

7. The method of claim 1 wherein the weight of an entry is updated dynamically based on the time since an item containing data matching the entry was added to the data store.

8. The method of claim 1 wherein the weight of an entry is updated dynamically as new information enters the data store.

9. The method of claim 1 wherein automatically resolving contact entries comprises providing a most probable match to an input.

10. The method of claim 1 wherein automatically resolving contact entries comprises providing a most recently used match to an input.

11. The method of claim 1 wherein automatically resolving contact entries comprises providing the entry having the greatest weight where one or more entries match an input.

12. The method of claim 1 wherein the size of the list is constrained to improve performance of automatically resolving contact entries.

13. The method of claim 1 wherein the size of the list is specified by a user.

14. The method of claim 1 wherein the list is disabled by a user.

15. The method of claim 1 wherein the new entry is not added to the list if all entries in the list have higher weights than the new entry.

16. The method of claim 1 wherein an entry in the list having the lowest weight will be chosen at random and replaced with the new entry if the lowest weight of entries in the list is equal to the weight of the new entry and that weight is shared by at least two entries in the list.

17. The method of claim 1 wherein new entries are added to the list after those entries are first used.

18. The method of claim 1 wherein an existing contact database is used with the maintained list for automatically resolving contact entries.

19. The method of claim 1 wherein the maintained list is stored in random access memory and cached in a nonvolatile storage medium.

20. The method of claim 1 wherein entries are removed from the list when matching entries are added to a contact database.

21. The method of claim 14 wherein entries are not added to the list if they are already stored in a contact database.

22. The method of claim 1 wherein the automatically resolved contact entry is selectable by a user via a user interface.

23. The method of claim 1 wherein items entering the data store are automatically scanned for contact information as the items enter the data store.

24. The method of claim 1 wherein entries in the list are automatically updated as new information matching the entries enter the data store.

25. The method of claim 1 wherein particular items within the data store are excluded from tracking.

26. The method of claim 1 wherein email received from at least one of specific email addresses and Internet domains are excluded from tracking.

27. The method of claim 1 wherein the contact information of the entries includes a plurality of information elements including:

an email address;
a friendly name;
a number of times that the entry has been used;
a date the email address was last sent to;
a date the email address was last received from; and
a weight.

* * * * *